US010550817B2

(12) United States Patent
Okitsu et al.

(10) Patent No.: US 10,550,817 B2
(45) Date of Patent: Feb. 4, 2020

(54) IDLE STOP CONTROL METHOD AND IDLE STOP CONTROL DEVICE

(71) Applicant: NISSAN MOTOR CO., LTD., Yokohama-shi, Kanagawa (JP)

(72) Inventors: Yuta Okitsu, Kanagawa (JP); Hiromoto Shimizu, Kanagawa (JP); Haruki Satou, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/771,019

(22) PCT Filed: Oct. 30, 2015

(86) PCT No.: PCT/JP2015/005471
§ 371 (c)(1),
(2) Date: Apr. 25, 2018

(87) PCT Pub. No.: WO2017/072820
PCT Pub. Date: May 4, 2017

(65) Prior Publication Data
US 2018/0306128 A1 Oct. 25, 2018

(51) Int. Cl.
*F02N 11/08* (2006.01)
*B60W 30/18* (2012.01)
(Continued)

(52) U.S. Cl.
CPC ......... *F02N 11/0822* (2013.01); *B60W 10/06* (2013.01); *B60W 30/18118* (2013.01); *F02D 29/02* (2013.01); *F02N 11/0818* (2013.01); *F02N 11/10* (2013.01); *B60W 30/18018* (2013.01); *F02D 41/22* (2013.01);
(Continued)

(58) Field of Classification Search
CPC ....... B60W 30/18018; B60W 30/18118; F02N 11/0818; F02N 11/0822
See application file for complete search history.

(56) References Cited

U.S. PATENT DOCUMENTS 7,455,369 B2 * 11/2008 Claussen ................. B60T 13/22
188/352
7,657,366 B2 * 2/2010 Guy ....................... B60K 28/04
701/112
(Continued)

FOREIGN PATENT DOCUMENTS

EP 1 612 408 A1 1/2006
JP 2006-342777 A 12/2006
(Continued)

*Primary Examiner* — Kevin R Steckbauer
(74) *Attorney, Agent, or Firm* — Foley & Lardner LLP (57) ABSTRACT

When a permission condition which is set in advance is satisfied in a state in which a vehicle is stopped by an operation of a brake pedal by the driver, an engine mounted on the vehicle is automatically stopped; and when the engine is automatically stopped, while a vehicle stop maintaining control to generate a braking force capable of maintaining a stop state of the vehicle is operated even when a brake operation is reduced, there is started notification to the occupant of the vehicle about ignition information which indicates that a state of an ignition switch of the vehicle is on when a parking brake is operated.

3 Claims, 6 Drawing Sheets

(51) Int. Cl.
*F02D 29/02* (2006.01)
*F02N 11/10* (2006.01)
*B60W 10/06* (2006.01)
*F02D 41/22* (2006.01)

(52) U.S. Cl.
CPC ............... *F02D 2041/228* (2013.01); *F02N 2200/0803* (2013.01); *F02N 2200/102* (2013.01); *Y02T 10/48* (2013.01)

(56) References Cited

U.S. PATENT DOCUMENTS

| | | | | |
|---|---|---|---|---|
| 8,521,386 | B2 * | 8/2013 | Hiyoshi | B60W 10/06 701/104 |
| 8,690,729 | B2 * | 4/2014 | Gwon | B60W 10/06 477/94 |
| 8,897,990 | B2 * | 11/2014 | Kim | F02N 11/0833 123/179.4 |
| 8,909,461 | B2 * | 12/2014 | Geissenhoener | B44D 3/18 123/198 F |
| 9,291,118 | B2 | 3/2016 | Kokon | |
| 9,517,770 | B2 * | 12/2016 | Yu | B60T 7/122 |
| 10,220,806 | B2 * | 3/2019 | Elangovan | B60R 21/01512 |
| 10,266,178 | B2 * | 4/2019 | Khafagy | B60W 10/06 |
| 10,280,868 | B2 * | 5/2019 | Kemwal | B60K 28/04 |
| 2007/0267238 | A1 * | 11/2007 | Guy | B60K 28/04 180/272 |
| 2010/0076656 | A1 * | 3/2010 | Hiyoshi | B60W 10/06 701/70 |
| 2012/0142491 | A1 * | 6/2012 | Gwon | B60W 10/06 477/94 |
| 2012/0143467 | A1 * | 6/2012 | Yu | F02N 11/0818 701/102 |
| 2012/0143468 | A1 * | 6/2012 | Kim | F02N 11/0833 701/102 |
| 2013/0158843 | A1 | 6/2013 | Kokon | |
| 2016/0023660 | A1 * | 1/2016 | Yu | B60T 7/122 477/188 |
| 2016/0297415 | A1 * | 10/2016 | Kato | B60W 30/18118 |
| 2016/0297443 | A1 * | 10/2016 | Kato | B60T 7/122 |
| 2017/0253245 | A1 * | 9/2017 | Khafagy | B60K 28/04 |
| 2017/0356415 | A1 * | 12/2017 | Khafagy | B60K 6/48 |
| 2018/0105178 | A1 * | 4/2018 | Khafagy | B60W 10/06 |

FOREIGN PATENT DOCUMENTS

| | | | | |
|---|---|---|---|---|
| JP | 2006342777 | A * | 12/2006 | ............... B60T 7/12 |
| JP | 2009-002236 | A | 1/2009 | |
| JP | 2011-149348 | A | 8/2011 | |
| JP | 2012-087730 | A | 5/2012 | |
| JP | 2015-034484 | A | 2/2015 | |
| WO | WO 2015/075533 | A1 | 5/2015 | |

* cited by examiner

IDLE STOP CONTROL METHOD AND IDLE STOP CONTROL DEVICE

TECHNICAL FIELD

The present invention relates to an idle stop control method and an idle stop control device.

BACKGROUND ART

As a technology of notifying the driver of a control state of an idle stop, which is a synonym for an idle reduction and an idling stop, for automatically stopping an engine, for example, there is a configuration disclosed in PTL 1.

In a technology disclosed in PTL 1, an engine is automatically stopped in a state in which a vehicle stops when an ignition switch is in an on state and further the driver operates a brake pedal. Afterwards, when a neutral range is selected, a stop state of the engine is continued in a state in which an operation of the brake pedal is cancelled (the brake pedal is not operated).

CITATION LIST

Patent Literature

PTL 1: JP 2012-087730 A

SUMMARY OF INVENTION

Technical Problem

However, in the technology of PTL 1 as described above, a stop state of the engine continues when the ignition switch is in an on state so that it is possible that the driver as cancelling an operation of the brake pedal misunderstands that a state of the ignition switch is off. Thus, it is feared that the driver as misunderstanding that a state of the ignition switch is off gets out of the vehicle in which the engine temporarily stops.

The present invention has been made in view of the problem as described above, and it is an object of the present invention to provide an idle stop control method and an idle stop control device capable of inhibiting the driver from getting out of a vehicle in which a state of an ignition switch is on.

SOLUTION TO PROBLEM

To solve the above problem, in one aspect of the present invention, when a permission condition set in advance is satisfied, an engine of a vehicle is automatically stopped. In addition, when a parking brake is operated while the engine is automatically stopped, there is notified, to the driver, ignition information for indicating that a state of an ignition switch is on.

Advantageous Effects of Invention

According to one aspect of the present invention, after the engine is automatically stopped and at a time at which the parking brake is operated, the ignition information is notified to the driver of the vehicle.

Thereby, it is enabled to notify the driver of the ignition information as having performed an operation of operating the parking brake which is an operation that is highly possibly performed at a time at which the driver gets out of the vehicle. Thus, it is enabled to provide an idle stop control method and an idle stop control device capable of inhibiting the driver from getting out of the vehicle in which a state of the ignition switch is on.

BRIEF DESCRIPTION OF DRAWINGS

FIG. 3-1 is a flowchart illustrative of a process performed by the idle stop control device according to the first embodiment of the present invention;

FIG. 3-2 is a flowchart illustrative of a process performed by the idle stop control device according to the first embodiment of the present invention;

DESCRIPTION OF EMBODIMENTS

In the following detailed description, specific particulars will be described so as to provide full understanding of embodiments of the present invention. However, it will become apparent that one or more embodiments can be carried out even in the absence of such specific particulars. In addition, known structures and devices are sometimes schematically illustrated in order to simplify the drawings.

(First Embodiment)

Hereinafter, a first embodiment of the present invention will be described with reference to the drawings.

(Configuration of Idle Stop Control Device)

Figure 1:
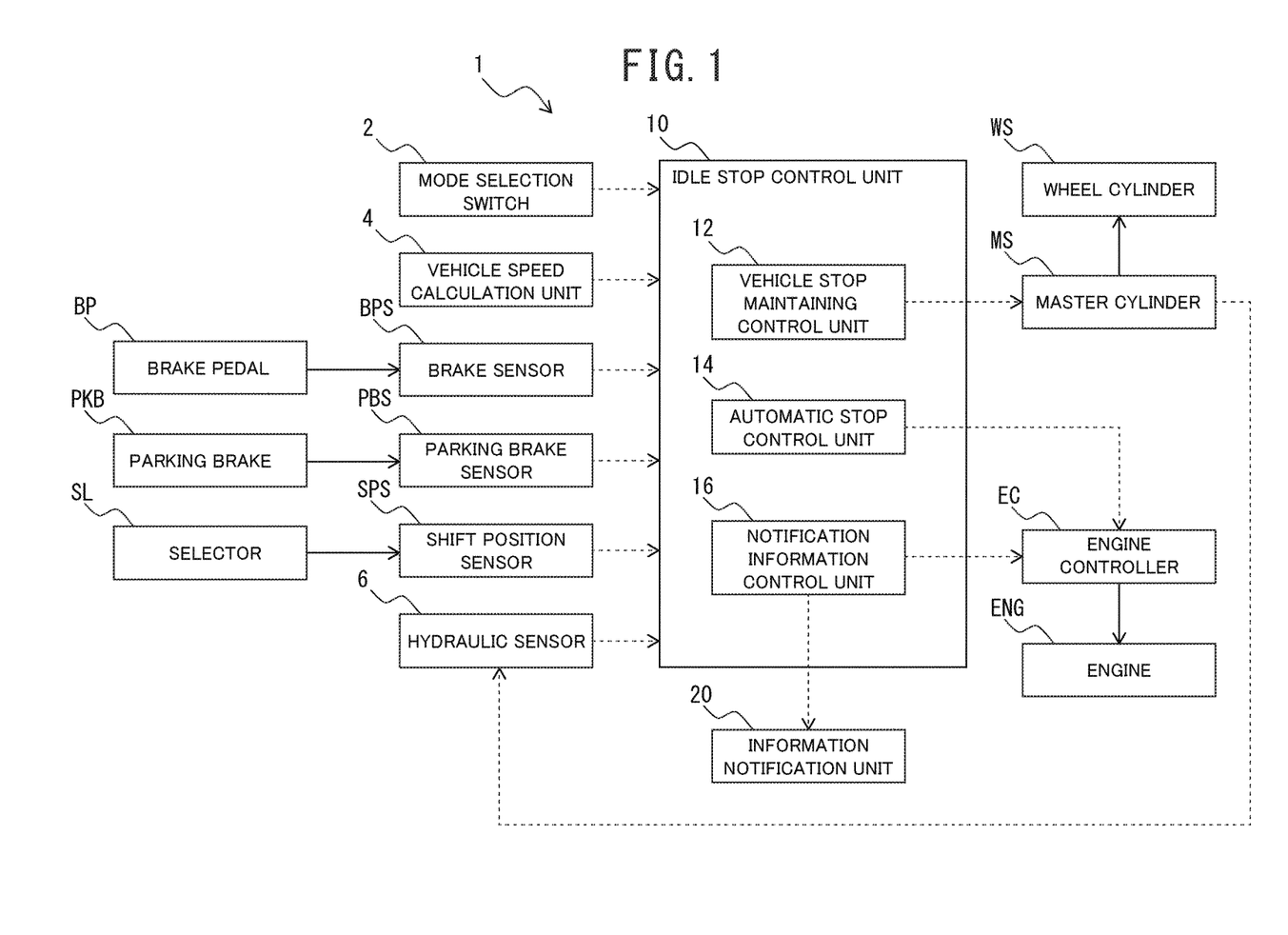
FIG. 1 is a block diagram illustrative of a configuration of an idle stop control device according to a first embodiment of the present invention.
Figure 2:
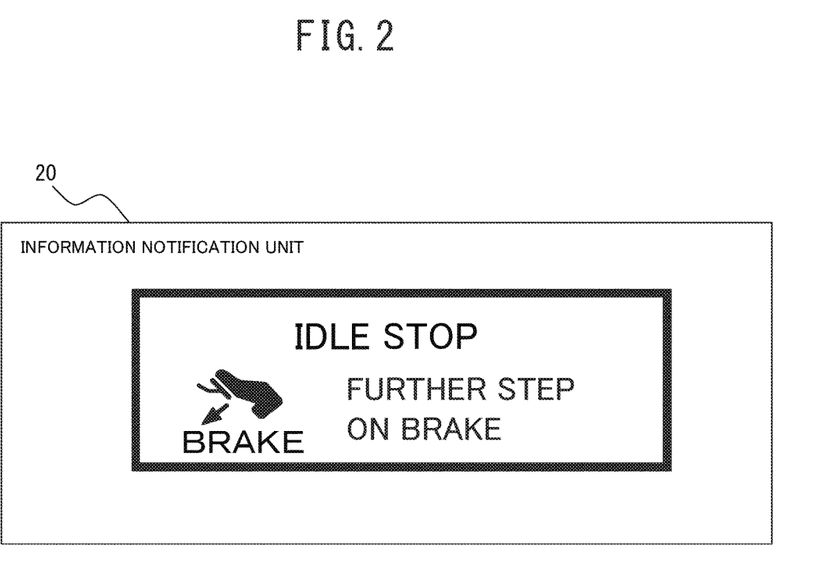
FIG. 2 is a diagram illustrative of a state in which support information is lit up in a display device.

With reference to FIGS. 1 and 2, a configuration of an idle stop control device 1 according to the first embodiment will be described.

As illustrated in FIG. 1, the idle stop control device 1 includes an idle stop control unit 10 and an information notification unit 20.

The idle stop control unit 10 is configured, for example, by a microcomputer and mounted on a vehicle provided with the idle stop control device 1 (referred to as "vehicle" in the description hereinafter).

Note that the microcomputer is a configuration including, for example, a central processing unit (CPU), a random access memory (RAM), a read only memory (ROM), and the like.

Further, the idle stop control unit 10 receives an input of an information signal from a mode selection switch 2, a vehicle speed calculation unit 4, a brake sensor BPS, a parking brake sensor PBS, a shift position sensor SPS, and a hydraulic sensor 6.

The mode selection switch 2 is a switch for selecting whether or not to perform a vehicle stop maintaining control (also referred to as stand still assist (SSA)).

The vehicle stop maintaining control is a control to generate a braking force capable of maintaining a state in which the vehicle is stopped (stop state of the vehicle) even when from a state in which the vehicle is stopped by an operation of a brake pedal BP by the driver, the driver reduces an operation amount of the brake pedal BP.

In other words, the vehicle stop maintaining control is a control to generate a braking force capable of maintaining a stop state of the vehicle even when a brake operation is reduced.

In the first embodiment, by way of example, there will be described a case in which the vehicle stop maintaining control is a control to generate a braking force capable of maintaining a stop state of the vehicle even if from a state in which the vehicle is stopped by an operation of the brake pedal BP by the driver, the driver cancels an operation of the brake pedal BP.

In other words, the vehicle stop maintaining control is a control to generate a braking force capable of maintaining a stop state of the vehicle by a control which is automatically performed at a vehicle side regardless of an operation of the brake pedal BP which is performed by the driver.

Note that "cancelling an operation of the brake pedal BP" is similar in meaning to configuring an opening degree of the brake pedal BP to be 0 [°].

Further, from the mode selection switch 2, an information signal containing a selection result of the vehicle stop maintaining control (occasionally referred to as "control selection signal" in the description hereinafter) is outputted to the idle stop control unit 10.

The vehicle speed calculation unit 4 receives, from a wheel speed sensor (unillustrated), an input of a wheel speed signal containing a rotational speed of a wheel provided to the vehicle. Then, the vehicle speed calculation unit 4 calculates a travel speed of the vehicle (occasionally referred to as "vehicle speed" in the description hereinafter) using the rotational speed contained in the wheel speed signal. In addition, the vehicle speed calculation unit 4 outputs an information signal containing the vehicle speed as calculated (occasionally referred to as "vehicle speed signal" in the description hereinafter) to the idle stop control unit 10.

Note that the vehicle speed calculation unit 4 may also have a configuration, for example, provided to a known vehicle dynamics control (VDC) system.

The wheel speed sensor is mounted on the vehicle. Further, the wheel speed sensor allows a preconfigured number of wheel speed pulses to be generated per rotation of the wheel provided to the vehicle.

The brake sensor BPS is a sensor which detects an operation amount (step-on operation amount) of the brake pedal BP by the driver.

The brake pedal BP is a pedal which the driver of the vehicle steps on in accordance with only a braking force demand.

Further, the brake sensor BPS outputs an information signal containing an operation amount of the brake pedal BP by the driver to the idle stop control unit 10.

Note that the brake sensor BPS is formed, for example, using a pedal stroke sensor. Further, a configuration of the brake sensor BPS is not to be limited to a configuration made using a pedal stroke sensor but may be also, for example, a configuration to detect a pressure of a master cylinder MS (master cylinder pressure) by a step-on operation by the driver.

In other words, the brake sensor BPS is a sensor which detects an operation amount (brake operation) of the brake pedal BP by the driver.

The parking brake sensor PBS outputs an information signal containing an operation state of a parking brake PKB to the idle stop control unit 10.

The parking brake PKB is operated or cancelled by an operation of a lever, a button, or the like by the driver.

Further, when the parking brake PKB is operated, the wheel and a propeller shaft (unillustrated) is fixed.

In the first embodiment, by way of example, there will be described a case in which a configuration of the parking brake PKB is an electric parking brake (ePKB) having a configuration in which an electric actuator, such as a motor, is driven, thereby fixing the wheel and the propeller shaft.

Note that the configuration of the parking brake PKB is not to be limited to the electric parking brake but may be also a configuration in which an operation of a lever, a pedal, or the like by the driver is transmitted so as to fix the wheel and the propeller shaft.

The shift position sensor SPS detects a range (shift position) as selected by an operation of a selector SL by the driver. Further, the shift position sensor SPS outputs an information signal containing the range as detected to the idle stop control unit 10.

The selector SL includes a lever, a button, or the like which is operated by the driver. Further, the selector SL is operated by the driver, whereby the range is selected.

The range which is selected by the selector SL includes a drive range and a non-drive range.

The drive range is a range selected when the vehicle travels and includes a rearward range (R range) selected at a time of a rearward travel and a plural-stage forward range (ID range, L range, 2 range, and the like) selected at a time of a forward travel.

The non-drive range is a range selected when the vehicle is stopped and includes a parking range (P range) in which a transmission is fixed and a neutral range (N range) in which a drive force transmission path from an engine ENG to the wheel is interrupted.

The hydraulic sensor 6 detects a fluid pressure of a brake fluid which is supplied from the master cylinder MS to a hydraulic system (for example, a dual system consisting of a primary system and a secondary system) in which the brake fluid moves. Then, the hydraulic sensor 6 outputs an information signal containing the fluid pressure as detected (occasionally referred to as "fluid pressure signal" in the description hereinafter) to the idle stop control unit 10.

The information notification unit 20 is formed, for example, using a display device (indicator) disposed in a combination meter. Note that the combination meter is provided in an instrument panel of a driver seat.

Further, the information notification unit 20 lights up support information as illustrated in FIG. 2 in the display device disposed in the combination meter or turns off the support information in accordance with an information signal as inputted from the idle stop control unit 10.

The support information is information required so as to satisfy a permission condition for performing an automatic stop (similar in meaning to an idle stop, an idle reduction, and an idling stop) of the engine in a state in which the vehicle stop maintaining control operates. In other words, the support information is information for satisfying the permission condition.

Note that the "state in which the vehicle stop maintaining control operates" is a state in which a braking force capable of maintaining a stop state of the vehicle is generated by a control which is automatically performed at a vehicle side regardless of an operation of the brake pedal BP by the driver.

The permission condition is a condition which is set in advance.

In the first embodiment, by way of example, there will be described a case in which with respect to the permission condition, a condition in which a brake fluid pressure in accordance with an operation amount of the brake pedal BP is greater than or equal to a permission fluid pressure which is set in advance is set to be the permission condition. Thus, the support information as illustrated in FIG. 2 is a display to induce the driver to increase an operation amount of the brake pedal BP so that, in a state in which a brake fluid pressure in accordance with the operation amount of the brake pedal BP is less than the permission fluid pressure, the brake fluid pressure is allowed to be greater than or equal to the permission fluid pressure.

Note that the permission fluid pressure is set to be a pressure greater than a brake fluid pressure at which a stop state of the vehicle can be maintained, for example, when a state of a road surface of travel is a normal state, for example, a flat road which is not covered with snow, and the like.

Specifically, the display to induce the driver to increase an operation amount of the brake pedal BP is a display of an icon which indicates character information of "further step on brake" and a relationship between the brake pedal BP and a foot of the driver.

Further, the permission condition may also include, for example, a condition in which a steering angle of a steering wheel falls within a threshold value steering angle which is set in advance, a condition in which a direction indicator is turned off, and a condition in which the shift position is at the drive range ("D" range or the like).

In other words, the information notification unit 20 is a configuration for notifying the occupant of the vehicle of the support information for satisfying the permission condition.

Note that in the information notification unit 20, information indicating that the vehicle stop maintaining control is in operation (for example, character information, such as "SSA in operation") may be also displayed.

Further, the idle stop control unit 10 includes a vehicle stop maintaining control unit 12, an automatic stop control unit 14, and a notification information control unit 16.

The vehicle stop maintaining control unit 12 refers to the control selection signal as inputted from the mode selection switch 2. Then, when the control selection signal contains a selection result that the vehicle stop maintaining control is to be performed, the vehicle speed signal as inputted from the vehicle speed calculation unit 4 and the fluid pressure signal as inputted from the hydraulic sensor 6 are referred to.

Further, the vehicle stop maintaining control unit 12 determines whether or not the vehicle stop maintaining control is to be operated in accordance with the vehicle speed contained in the vehicle speed signal and the fluid pressure contained in the fluid pressure signal.

Specifically, when conditions A1 to A3 as described below are satisfied, it is determined that the vehicle stop maintaining control is to be operated.

Condition A1: the vehicle speed is zero (similar in meaning to 0 [km/h]. The same applies to the description hereinafter), i.e., the vehicle is stopped.

Condition A2: the fluid pressure of the brake fluid is greater than or equal to an intervention fluid pressure which is set in advance (SSA intervention fluid pressure).

Condition A3: an operation amount of the brake pedal BP exceeds a predetermined amount (for example, zero or an amount which overcomes a creep torque. The same applies to the description hereinafter), i.e., the brake pedal BP is operated.

The intervention fluid pressure is a fluid pressure which is set to be less than the permission fluid pressure.

The vehicle stop maintaining control unit 12 as determining that the vehicle stop maintaining control is to be operated outputs a command value for generating a braking force capable of maintaining a stop state of the vehicle (occasionally referred to as "vehicle stop maintaining command value" in the description hereinafter) to the master cylinder MS.

Further, the vehicle stop maintaining control unit 12 as determining that the vehicle stop maintaining control is not to be operated in a state in which the vehicle stop maintaining command value is outputted to the master cylinder MS stops an output of the vehicle stop maintaining command value.

Moreover, the vehicle stop maintaining control unit 12 as determining that the vehicle stop maintaining control is to be operated outputs an information signal containing a determination result that the vehicle stop maintaining control is to be performed (occasionally referred to as "vehicle stop maintaining determination signal" in the description hereinafter) to the automatic stop control unit 14 and the notification information control unit 16.

When receiving an input of the vehicle stop maintaining determination signal from the vehicle stop maintaining control unit 12, the automatic stop control unit 14 determines whether or not the permission condition is satisfied. Then, when it is determined that the permission condition is satisfied, a command to stop the engine ENG in operation (occasionally referred to as "engine stop command" in the description hereinafter) is outputted to an engine controller EC and the notification information control unit 16.

Accordingly, when the permission condition is satisfied, the automatic stop control unit 14 performs an automatic stop (an idle stop, an idle reduction, and an idling stop) of the engine ENG in operation.

In the first embodiment, by way of example, there will be described a case in which a configuration of the automatic stop control unit 14 is a configuration in which when the permission condition is satisfied in a state in which the vehicle stop maintaining control is operated, the engine ENG in operation is automatically stopped.

In other words, the automatic stop control unit 14 according to the first embodiment automatically stops the engine ENG when the permission condition is satisfied in a state in which the vehicle is stopped by an operation of the brake pedal BP by the driver.

When receiving an input of the vehicle stop maintaining determination signal from the vehicle stop maintaining control unit 12, the notification information control unit 16 determines whether or not an input of the engine stop command from the automatic stop control unit 14 is received. In other words, the notification information control unit 16 determines whether or not the permission condition is satisfied in a state in which the vehicle stop maintaining control is operated.

Then, when receiving and input of the engine stop command in a state in which the vehicle stop maintaining determination signal is inputted, the notification information control unit 16 determines that the permission condition is satisfied in a state in which the vehicle stop maintaining control is operated.

The notification information control unit 16 as determining that the permission condition is satisfied refers to the information signal as outputted from the brake sensor BPS and the information signal as inputted from the parking brake sensor PBS. In addition, the notification information control unit 16 as determining that the permission condition is satisfied refers to the information signal as inputted from the shift position sensor SPS and the fluid pressure signal as inputted from the hydraulic sensor 6.

Further, the notification information control unit 16 determines whether or not to notify the occupant of the vehicle of ignition information in accordance with the operation amount of the brake pedal BP, an operation state of the parking brake PKB, the range as selected by the driver, and the fluid pressure which are contained in each type of the information signals as inputted.

Specifically, when conditions A4 to A7 as described below are satisfied in a state in which the engine ENG is automatically stopped, it is determined to notify the occupant of the vehicle of the ignition information.

Condition A4: the operation amount of the brake pedal BP is zero, i.e., the brake pedal BP is not operated and an operation of the brake pedal is cancelled.

Condition A5: the parking brake PKB is operated.

Condition A6: by an operation of the selector SL by the driver, the non-drive range (P range or N range) is selected.

Condition A7: the fluid pressure of the brake fluid is less than the intervention fluid pressure (SSA intervention fluid pressure.

The ignition information is information which indicates that a state of an ignition switch (unillustrated) provided to the vehicle is on.

In the first embodiment, by way of example, there will be described a case in which the engine ENG as automatically stopped is restarted, thereby notifying the occupant of the vehicle of the ignition information.

Accordingly, in the first embodiment, byway of example, there will be described a case in which a configuration of the notification information control unit 16 is a configuration in which when the conditions A4 to A7 as described above are satisfied, an engine restart command is outputted to the engine controller EC.

The engine restart command is a command to restart the engine ENG as automatically stopped.

The ignition switch is a switch to select a start or a stop of the engine ENG by an operation of the occupant (driver) of the vehicle.

Further, that "a state of the ignition switch is on" indicates a state in which the ignition switch is operated so that the engine ENG is started. Moreover, that "a state of the ignition switch is off" indicates a state in which the engine ENG as started is stopped by an operation of the ignition switch.

On the other hand, when not receiving and input of the engine stop command in a state in which the vehicle stop maintaining determination signal is inputted, the notification information control unit 16 determines that the permission condition is not satisfied in a state in which the vehicle stop maintaining control is operated.

The notification information control unit 16 as determining that the permission condition is not satisfied outputs an information signal containing a command to light up the support information in the display device (occasionally referred to as "information lighting-up signal" in the description hereinafter) to the information notification unit 20.

Further, the notification information control unit 16 outputs an information signal containing a command to turn off the support information at a time at which, from a time at which the support information lighting-up signal is outputted to the information notification unit 20, a notification continuation time elapses (occasionally referred to as "information turning-off signal" in the description hereinafter) to the information notification unit 20.

The notification continuation time is a time which is set in advance. Further, the notification continuation time is set, for example, in accordance with a car class of the vehicle (class of the vehicle according to a body size, a displacement of the engine ENG, and the like) and a position (visual recognition position) of the display device provided to the information notification unit 20.

Note that in the first embodiment, by way of example, there will be described a case in which the notification continuation time is set to be 2 [sec].

As described above, the notification information control unit 16 starts to notify the occupant of the vehicle of the ignition information at a time at which the operation amount of the brake pedal BP is zero, while the parking brake PKB is operated in a state in which the engine ENG is automatically stopped.

The master cylinder MS is a device which supplies to a wheel cylinder WS the brake fluid.

Further, the master cylinder MS allows a piston in the master cylinder MS to operate, for example, by allowing a motor for brakes (unillustrated) housed in the master cylinder MS, and the like, to operate in accordance with the vehicle stop maintaining command value as inputted from the idle stop control unit 10. Thereby, in the master cylinder MS, a fluid pressure in accordance with the vehicle stop maintaining command value is generated. Then, the brake fluid having the fluid pressure in accordance with the vehicle stop maintaining command value is supplied to the wheel cylinder WS.

The wheel cylinder WS allows a pressing force for pressing a brake pad (unillustrated) which constitutes a disk brake onto a disk rotor (unillustrated) to be generated. The disk rotor rotates integrally with each wheel W and comes into contact with the brake pad so as to generate a frictional resistance.

In other words, the master cylinder MS and the wheel cylinder WS are provided to the wheel and form a frictional brake which generates a frictional braking force at the wheel.

The engine controller EC stops the engine ENG in operation in accordance with the engine stop command as inputted from the idle stop control unit 10.

The engine ENG forms a drive force generation source of the vehicle.

As described above, the idle stop control unit 10 controls the master cylinder MS, the engine controller EC, and the information notification unit 20 which are provided to the vehicle using each type of the information signals as inputted.

(Process Performed by the Idle Stop Control Unit 10)

With reference to FIGS. 1 and 2 and using FIGS. 3-1 and 3-2, one example of a process performed by the idle stop control unit 10 will be described. Note that the process performed by the idle stop control unit 10 will be occasionally referred to as "idle stop control process" in the description hereinafter. Further, a process as illustrated in FIG. 3 is a process when the mode selection switch 2 is selected to perform the vehicle stop maintaining control.

Figure 31:
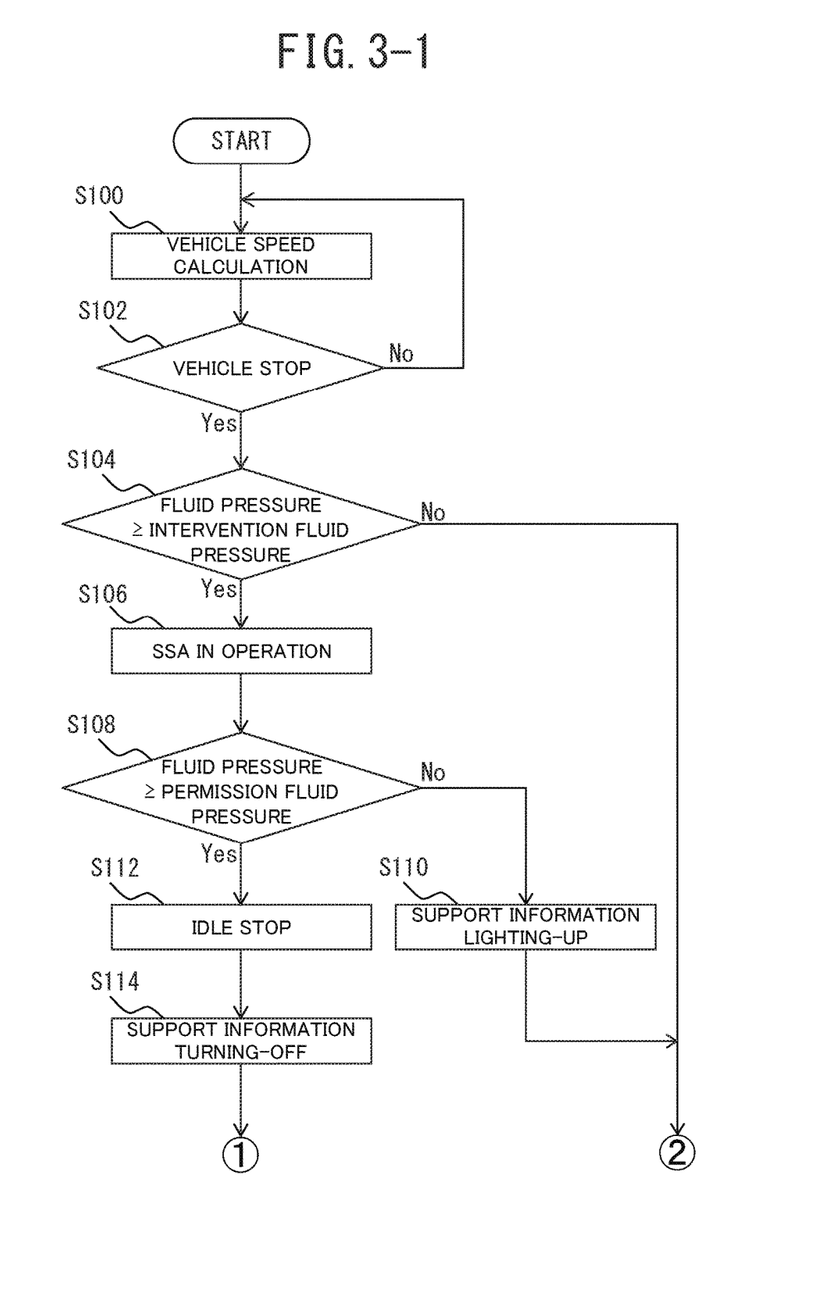

As illustrated in FIG. 3, when an idle stop control process is started (START), first, a process at step S100 is performed.

At step S100, the vehicle speed calculation unit 4 calculates a vehicle speed ("VEHICLE SPEED CALCULATION" as illustrated in the figure). At step S100, when the vehicle speed is calculated, the idle stop control process proceeds to step S102.

At step S102, it is determined whether or not the vehicle speed as calculated at step S100 is zero, thereby performing a process to determine whether or not the vehicle is stopped ("VEHICLE STOP" as illustrated in the figure).

At step S102, when it is determined that the vehicle is stopped ("Yes" as illustrated in the figure), the idle stop control process proceeds to step S104.

On the other hand, at step S102, when it is determined that the vehicle is not stopped ("No" as illustrated in the figure), the idle stop control process proceeds to step S100.

At step S104, the vehicle stop maintaining control unit 12 performs a process to determine whether or not a fluid pressure of the brake fluid as detected by the hydraulic sensor 6 is greater than or equal to the intervention fluid pressure ("FLUID PRESSURE ≥ INTERVENTION FLUID PRESSURE" as illustrated in the figure).

At step S104, when it is determined that the fluid pressure of the brake fluid is greater than or equal to the intervention fluid pressure("Yes" as illustrated in the figure), the idle stop control process proceeds to step S106.

On the other hand, at step S104, when it is determined that the fluid pressure of the brake fluid is less than the intervention fluid pressure ("No" as illustrated in the figure), the idle stop control process returns to the process at step S100 (RETURN).

At step S106, the vehicle stop maintaining control unit 12 outputs the vehicle stop maintaining command value to the master cylinder MS. In other words, at step S106, a process to operate the vehicle stop maintaining control ("SSA IN OPERATION" as illustrated in the figure) is performed. At step S106, when the vehicle stop maintaining control is operated, the idle stop control process proceeds to step S108.

At step S108, the automatic stop control unit 14 performs a process to determine whether or not the fluid pressure of the brake fluid as detected by the hydraulic sensor 6 is greater than or equal to the permission fluid pressure ("FLUID PRESSURE ≥ PERMISSION FLUID PRESSURE" as illustrated in the figure).

At step S108, when it is determined that the fluid pressure of the brake fluid is greater than or equal to the permission fluid pressure ("Yes" as illustrated in the figure), the idle stop control process proceeds to step S112.

On the other hand, at step S108, when it is determined that the fluid pressure of the brake fluid is less than the permission fluid pressure ("No" as illustrated in the figure), the idle stop control process proceeds to step S110.

At step S110, the information lighting-up signal is outputted from the notification information control unit 16 to the information notification unit 20. Thereby, at step S110, the support information is lighted up in the display device ("SUPPORT INFORMATION LIGHTING-UP" as illustrated in the figure). At step S110, when the support information is lighted up in the display device, the idle stop control process returns to the process at step S100 (RETURN).

At step S112, the automatic stop control unit 14 outputs the engine stop command to the engine controller EC. Thereby, at step S112, a process to automatically stop the engine ENG in operation ("IDLE STOP" as illustrated in the figure) is performed. At step S112, when the engine ENG in operation is automatically stopped, the idle stop control process proceeds to step S114.

At step S114, the information turning-off signal is outputted from the notification information control unit 16 to the information notification unit 20. Thereby, at step S114, the support information as lighted up in the display device is turned off ("SUPPORT INFORMATION TURNING-OFF" as illustrated in the figure). At step S114, when the support information as lighted up in the display device is turned off, the idle stop control process proceeds to step S116.

Figure 32:
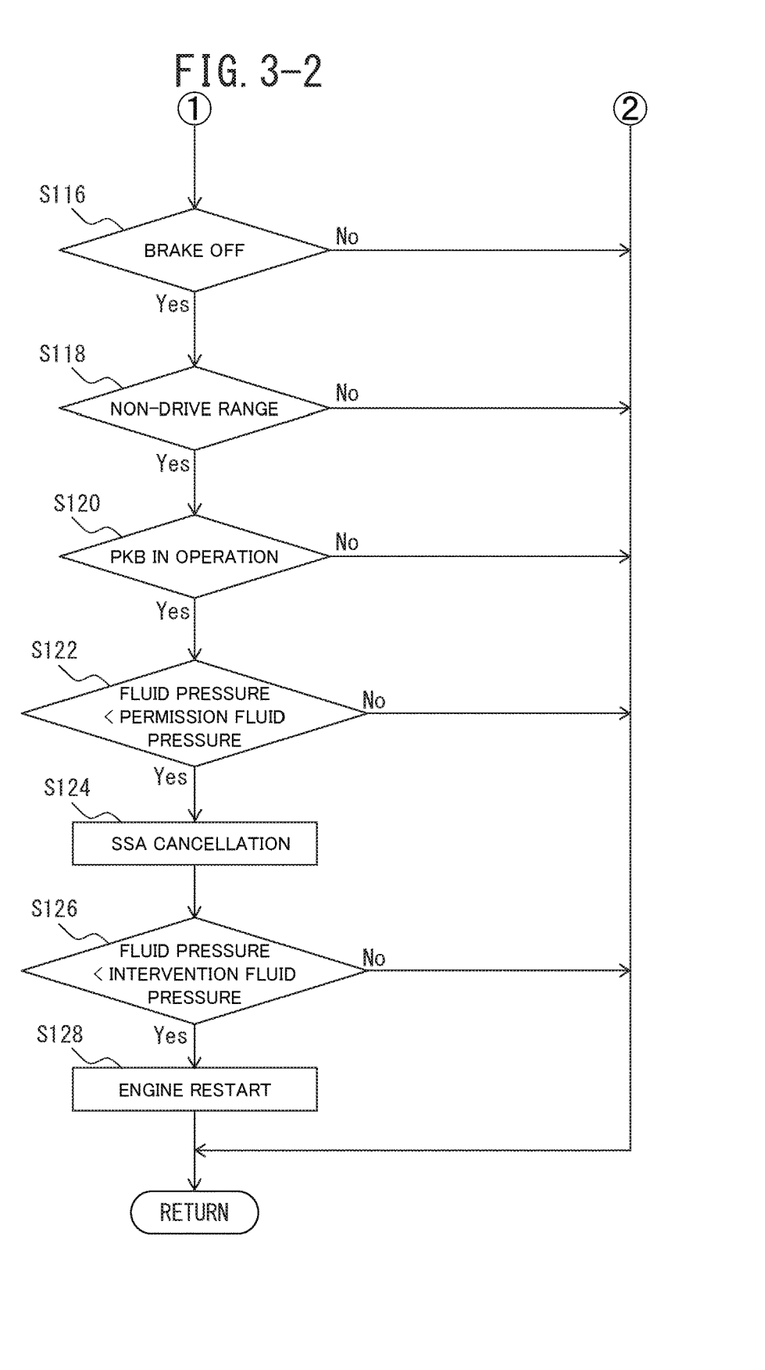

At step S116, the notification information control unit 16 performs a process to determine whether or not an operation amount of the brake pedal BP is zero ("BRAKE OFF" as illustrated in the figure).

At step S116, when it is determined that the operation amount of the brake pedal BP is reduced to be zero ("Yes" as illustrated in the figure), the idle stop control process proceeds to step S118.

On the other hand, at step S116, when it is determined that the operation amount of the brake pedal BP exceeds zero ("No" as illustrated in the figure), the idle stop control process returns to the process at step S100 (RETURN).

At step S118, the notification information control unit 16 performs a process to determine whether or not the non-drive range is selected by an operation of the selector SL by the driver ("NON-DRIVE RANGE" as illustrated in the figure).

At step S118, when it is determined that the non-drive range is selected ("Yes" as illustrated in the figure), the idle stop control process proceeds to step S120.

On the other hand, at step S118, when it is determined that the drive range is selected ("No" as illustrated in the figure), the idle stop control process returns to the process at step S100 (RETURN).

At step S120, the notification information control unit 16 performs a process to determine whether or not the parking brake PKB is operated ("PKB IN OPERATION" as illustrated in the figure).

At step S120, when it is determined that the parking brake PKB is operated ("Yes" as illustrated in the figure), the idle stop control process proceeds to step S122.

On the other hand, at step S120, when it is determined that the parking brake PKB is not operated ("No" as illustrated in the figure), the idle stop control process returns to the process at step S100 (RETURN).

At step S122, the automatic stop control unit 14 performs a process to determine whether or not the fluid pressure of the brake fluid as detected by the hydraulic sensor 6 is less than the permission fluid pressure ("FLUID PRESSURE<PERMISSON FLUID PRESSURE" as illustrated in the figure).

At step S122, when it is determined that the fluid pressure of the brake fluid is less than the permission fluid pressure ("Yes" as illustrated in the figure), the idle stop control process proceeds to step S124.

On the other hand, at step S122, when it is determined that the fluid pressure of the brake fluid is greater than or equal to the permission fluid pressure ("No" as illustrated in the figure), the idle stop control process returns to the process at step S100 (RETURN).

At step S124, the vehicle stop maintaining control unit 12 stops outputting the vehicle stop maintaining command value to the master cylinder MS. In other words, at step S124, a process to cancel the vehicle stop maintaining control in operation ("SSA CANCELLATION" as illustrated in the figure) is performed. At step S124, when the vehicle stop maintaining control in operation is cancelled, the idle stop control process proceeds to step S126.

At step S126, the notification information control unit 16 performs a process to determine whether or not the fluid pressure of the brake fluid as detected by the hydraulic sensor 6 is less than the intervention fluid pressure ("FLUID PRESSURE<INTERVENTION FLUID PRESSURE" as illustrated in the figure).

At step S126, when it is determined that the fluid pressure of the brake fluid is less than the intervention fluid pressure ("Yes" as illustrated in the figure), the idle stop control process proceeds to step S128.

On the other hand, at step S126, when it is determined that the fluid pressure of the brake fluid is greater than or equal to the intervention fluid pressure ("No" as illustrated in the figure), the idle stop control process returns to the process at step S100 (RETURN).

At step S128, the engine restart command is outputted from the notification information control unit 16 to the engine controller EC. Thereby, at step S128, the engine as automatically stopped at step S112 is restarted ("ENGINE RESTART" as illustrated in the figure). At step S128, when the engine ENG as automatically stopped is restarted, the idle stop control process returns to the process at step S100 (RETURN).

(Operation)

Figure 4:
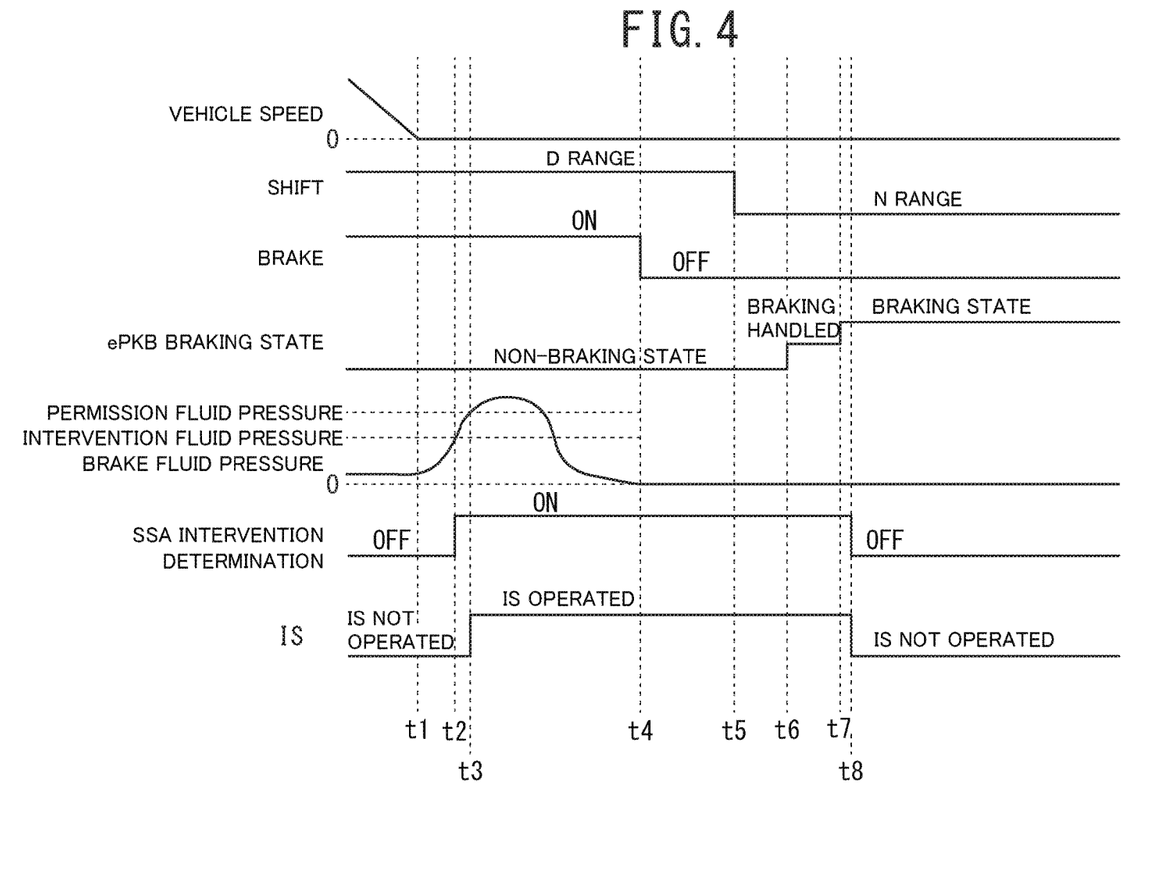
FIG. 4 is a time chart illustrative of an operation of a vehicle which is performed by a configuration in which the idle stop control device according to the first embodiment of the present invention is employed.

With reference to FIGS. 1 to 3 and using FIG. 4, one example of an operation performed using the idle stop control device 1 according to the first embodiment will be described. Note that FIG. 4 illustrates a time chart of an operation which is performed by a configuration in which the idle stop control device 1 according to the first embodiment is employed. Further, the time chart as illustrated in FIG. 4 is a time chart when the mode selection switch 2 is selected to perform the vehicle stop maintaining control.

Moreover, the time chart as illustrated in FIG. 4 starts from a state in which during a travel of the vehicle (vehicle speed>0), the driver operates the brake pedal BP (brake ON). Accordingly, at a time at which the time chart as illustrated in FIG. 4 is started, as the shift position, the D range (drive range) is selected.

Note that in an item indicated by "BRAKE" in FIG. 4, when an operation amount of the brake pedal BP is zero, "OFF" is indicated, and when an operation amount of the brake pedal BP exceeds zero, "ON" is indicated.

At the time at which the time chart as illustrated in FIG. 4 is started, a brake fluid pressure in accordance with an operation amount of the brake pedal BP by the driver is generated so that a vehicle speed is reduced. Moreover, at the time at which the time chart as illustrated in FIG. 4 is started, a brake fluid pressure is less than the intervention fluid pressure (SSA intervention determination OFF) so that the vehicle stop maintaining control is not operated. Further, at the time at which the time chart as illustrated in FIG. 4 is started, the engine is in operation and an idle stop is not operated (IS not operated).

Note that in an item indicated by "SSA INTERVENTION DETERMINATION" in FIG. 4, a state in which the brake fluid pressure is greater than or equal to the intervention fluid pressure and the vehicle stop maintaining control is operated is indicated by "ON", and a state in which the brake fluid pressure is less than the intervention fluid pressure and the vehicle stop maintaining control is not operated is indicated by "OFF". Similarly, in an item indicated by "IS" in FIG. 4, a state in which an idle stop is not operated is indicated by "IS NOT OPERATED", and a state in which an idle stop is operated is indicated by "IS OPERATED".

After the time chart as illustrated in FIG. 4 is started, at a time at which the vehicle speed amounts to zero, i.e., the vehicle is stopped (time t1), it is determined whether or not a condition in which the fluid pressure of the brake fluid is greater than or equal to the intervention fluid pressure and a condition in which the operation amount of the brake pedal BP exceeds zero are satisfied. Then, at a time at which it is determined that the fluid pressure of the brake fluid is greater than or equal to the intervention fluid pressure, while the operation amount of the brake pedal BP exceeds zero (time t2), the vehicle stop maintaining control is operated (SSA intervention determination ON).

After the time t2, it is determined whether or not a condition in which the fluid pressure of the brake fluid is greater than or equal to the permission fluid pressure is satisfied. Then, at a time at which it is determined that the fluid pressure of the brake fluid is greater than or equal to the permission fluid pressure (time t3), an idle stop is operated (IS operated).

Note that the brake fluid pressure at the time t3 a brake fluid pressure having such a magnitude as to be capable of maintaining a stop state of the vehicle against a creep torque generated in the vehicle in a state in which the engine ENG is operated.

After the time t3, when the operation amount of the brake pedal BP by the driver starts to be reduced and the operation amount of the brake pedal BP amounts to zero (time t4), the brake fluid pressure amounts to zero ("0" as illustrated in FIG. 4). Note that that the brake fluid pressure is zero means that the brake fluid pressure is 0 [kg/cm2], and the same applies in the description hereinafter.

In other words, at the time t4, the operation amount of the brake pedal BP and the brake fluid pressure amount to zero (brake OFF, brake fluid pressure zero). Thus, at the time t4, from among the conditions A4 to A7, the condition A4 and the condition A7 are satisfied.

After, at the time t4, the operation amount of the brake pedal BP and the brake fluid pressure amount to zero, it is determined whether or not a condition in which as the shift position, the non-drive range is selected and a condition in which the parking brake PKB is operated are satisfied.

Note that in an item indicated by "ePKB BRAKING STATE" in FIG. 4, a state in which the parking brake PKB is operated is indicated by "BRAKING STATE", and a state in which the parking brake PKB is not operated is indicated by "NON-BRAKING STATE". Further, in the item indicated by "ePKB BRAKING STATE" in FIG. 4, a state in which the parking brake PKB is being manipulated (started) is indicated by "BRAKING HANDLED".

Then, at a time at which as the shift position, the N range (non-drive range) is selected (time t5), from among the conditions A4 to A7, the condition A4, the condition A6, and the condition A7 are satisfied.

Further, at a time at which the parking brake PKB as started to be manipulated by the driver at the time t6 is operated (braking state) (time t7), the conditions A4 to A7 as described above are satisfied.

Thus, the time t7 is a time at which the engine is automatically stopped, a time at which the vehicle stop maintaining control is operated, and a time at which a condition in which an operation of the brake pedal BP is cancelled and a condition in which the parking brake PKB is operated are satisfied.

When the conditions A4 to A7 as described above are satisfied at the time t7, an output of the vehicle stop maintaining command value is stopped. Then, at a time at which a fluid pressure generated in the master cylinder MS is reduced to be less than a fluid pressure in accordance with the vehicle stop maintaining command value (time t8), the vehicle stop maintaining control in operation is stopped (SSA intervention determination OFF).

Further, at the time t8, the vehicle stop maintaining control in operation is stopped, while the engine restart command is outputted to the engine controller EC. Thereby, at the time t8, the engine ENG as automatically stopped at the time t3 is restarted (IS not operated).

Note that although not specifically illustrated, in the operation performed using the idle stop control device 1 according to the first embodiment, when an accelerator pedal provided to the vehicle is operated in a state in which the support information is lighted up, the support information as lighted up is turned off.

As described above, in the idle stop control device 1 according to the first embodiment, when the engine ENG is automatically stopped, while the vehicle stop maintaining control is operated, the engine ENG as automatically stopped is restarted. Herein, the engine ENG as automatically stopped is restarted at a time at which a condition in which an operation of the brake pedal BP is cancelled and a condition in which the parking brake PKB is operated are satisfied.

In other words, in the idle stop control device 1 according to the first embodiment, when the permission condition is satisfied, the engine ENG is automatically stopped, and when the parking brake PKB is operated while the engine ENG is automatically stopped, the ignition information is notified to the driver.

Thereby, the engine ENG as automatically stopped is restarted so that notification of the ignition information to the occupant of the vehicle is started.

As described above, in the idle stop control method using the idle stop control device 1 according to the first embodiment, when the permission condition is satisfied in a state in which the vehicle is stopped by an operation of the brake pedal BP by the driver, the engine ENG is automatically stopped. In addition, when the engine ENG is automatically stopped, while the vehicle stop maintaining control is operated, notification of the ignition information to the occupant of the vehicle is started at a time at which the conditions A4 and A5 as described above are satisfied.

In other words, in the idle stop control method according to the first embodiment, when the permission condition is satisfied, the engine ENG is automatically stopped, and when the parking brake PKB is operated while the engine ENG is automatically stopped, the ignition information is notified to the driver.

Note that the first embodiment as described above is one example of the present invention and the present invention is not to be limited to the first embodiment as described above, and in even embodiments other than such an embodiment, various modifications can be made in accordance with a design and the like without departing from the technical idea of the present invention.

(Effects of the First Embodiment)

In the idle stop control method using the idle stop control device 1 according to the first embodiment, it is enabled to produce effects as described below.

(1) When the permission condition is satisfied, the engine ENG is automatically stopped, and when the parking brake PKB is operated while the engine ENG is automatically stopped, the ignition information is notified to the driver.

Accordingly, after the engine ENG is automatically stopped and at a time at which the parking brake PKB is operated, the ignition information is notified to the driver of the vehicle.

As a result, it is enabled to notify the driver of the ignition information as having performed an operation of operating the parking brake PKB which is an operation that is highly possibly performed at a time at which the driver gets out of the vehicle.

Thus, it is enabled to inhibit the driver from getting out of the vehicle in which a state of the ignition switch is on.

(2) When the permission condition is satisfied in a state in which the vehicle is stopped by an operation of the brake pedal BP by the driver, the engine ENG is automatically stopped. In addition, when the engine ENG is automatically stopped, while the vehicle stop maintaining control is operated, notification of the ignition information to the occupant of the vehicle is started at a time at which the conditions A4 and A5 as described above are satisfied.

Accordingly, it is enabled that the ignition information is notified to the driver of the vehicle after the engine ENG is automatically stopped and at a time at which an operation of the brake pedal BP is cancelled by the driver, while the parking brake PKB is operated.

As a result, it is enabled to notify the driver of the ignition information as having performed and operation of cancelling an operation of the brake pedal BP and an operation of operating the parking brake PKB which are operations that are highly possibly performed at a time at which the driver gets out of the vehicle.

Thus, it is enabled to inhibit the driver from getting out of the vehicle in which a state of the ignition switch is on.

(3) The engine ENG as automatically stopped is restarted so that notification of the ignition information is started.

As a result, it is enabled to that to notify that a state of the ignition switch is on, by vibrations generated at the vehicle when the engine ENG is restarted, noises generated from the engine ENG, and the like, to the driver as having performed an operation which is highly possibly performed at a time at which the driver gets out of the vehicle.

(4) The engine ENG as automatically stopped is restarted only when the non-drive range is selected, thereby starting notification of the ignition information.

As a result, it is enabled to prevent transmission of a drive force from the engine ENG to the wheel at a time at which the engine ENG is restarted so that movement of the vehicle which is unintended to the driver can be inhibited.

Further, in the idle stop control device 1 according to the first embodiment, it is enabled to produce effects as described below.

(5) The automatic stop control unit 14 automatically stops the engine ENG when the permission condition is satisfied.

In addition, when the parking brake PKB is operated while the engine ENG is automatically stopped by the automatic stop control unit 14, the notification information control unit 16 notifies the ignition information to the driver.

Accordingly, after the engine ENG is automatically stopped and at a time at which the parking brake PKB is operated, the ignition information is notified to the driver of the vehicle.

As a result, it is enabled to notify the ignition information to the driver as having performed an operation of operating the parking brake PKB which is an operation that is highly possibly performed at a time at which the driver gets out of the vehicle.

Thus, it is enabled to inhibit the driver from getting out of the vehicle in which a state of the ignition switch is on.

(Modification Examples of the First Embodiment)

(1) In the first embodiment, the engine ENG as automatically stopped is restarted so that notification of the ignition information to the occupant of the vehicle is started. However, a configuration to start notification of the ignition information is not to be limited to the above.

In other words, notification of the ignition information to the occupant of the vehicle may be also started by displaying a character which indicates that a state of the ignition switch of the vehicle is on in the display device provided to the information notification unit 20.

Further, notification of the ignition information to the occupant of the vehicle maybe also started by restarting the engine ENG as automatically stopped, while displaying a character which indicates that a state of the ignition switch of the vehicle is on in the display device provided to the information notification unit 20.

Figure 5:
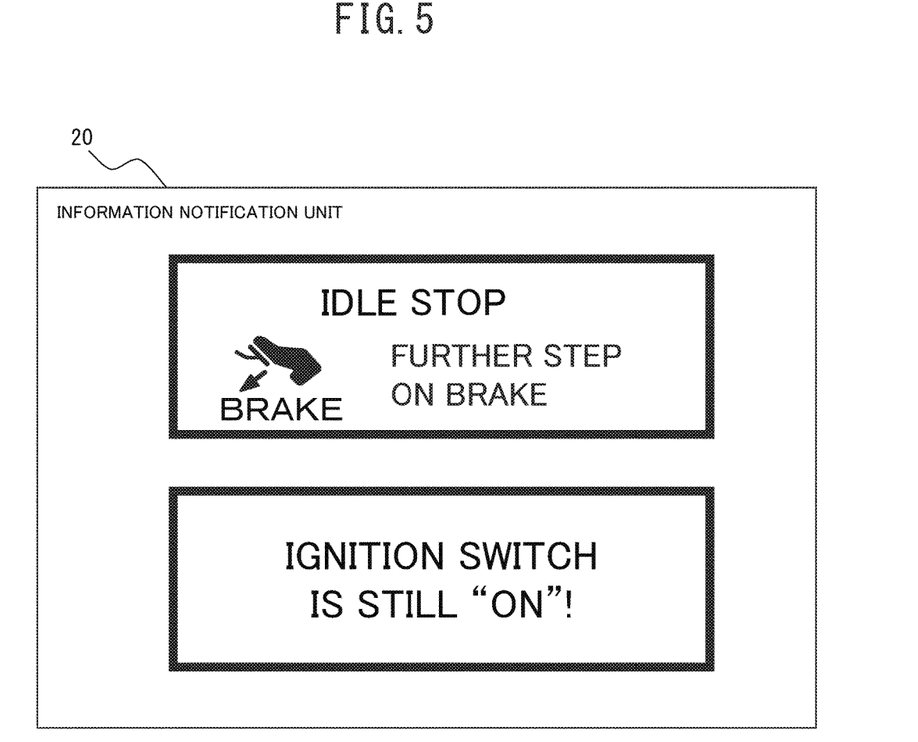
FIG. 5 is a diagram illustrative of a modification example of the first embodiment of the present invention.

Herein, the character which indicates that a state of the ignition switch of the vehicle is on is, for example, a character that "IGNITION SWITCH IS STILL "ON"!" as illustrated in FIG. 5. Further, an icon which indicates a state in which the ignition switch is on may be displayed in the display device provided to the information notification unit 20. Note that in FIG. 5, there is illustrated a state in which together with the support information, the ignition information of characters which indicates that a state of the ignition switch of the vehicle is on is lighted in the display device.

In such a case, a time in which a character or an icon is displayed in the display device provided to the information notification unit 20 may be changed in accordance with a time elapsed from when the engine ENG is automatically stopped to when the parking brake PKB is operated.

Specifically, the shorter the time elapsed from when the engine ENG is automatically stopped to when the parking brake PKB is operated is, the longer the time in which a character or an icon which indicates that a state of the ignition switch of the vehicle is on is displayed in the display device provided to the information notification unit 20 is configured to be.

(2) In the first embodiment, when the condition A6 is satisfied, i.e., when the non-drive range is selected, the engine ENG as automatically stopped is restarted so that notification of the ignition information to the occupant of the vehicle is started, which is, however, not limitative.

In other words, notification of the ignition information to the occupant of the vehicle may be also started by restarting the engine ENG as automatically stopped even when the drive range is selected (when the condition A6 is not satisfied).

(3) In the first embodiment, as illustrated in FIG. 2, the support information is a display to induce the driver to increase an operation amount of the brake pedal BP, but the support information is not limited to be limited to the above.

In other words, the support information may be also, for example, a noise (voice, alarm, or the like) to induce the driver to increase an operation amount of the brake pedal BP. Similarly, the ignition information may be also, for example, a noise (voice, alarm, or the like) to notify that a state of the ignition switch is on.

(4) In the first embodiment, a brake operation by the driver is an operation of the brake pedal BP by the driver, which is, however, not limitative.

In other words, when a configuration of the vehicle is, for example, a configuration provided with a brake lever which indicates a braking force of the vehicle by a manual operation by the driver, a brake operation by the driver may be also an operation of the brake lever by the driver.

REFERENCE SIGNS LIST

1 idle stop control device
2 mode selection switch
4 vehicle speed calculation unit
6 hydraulic sensor
10 idle stop control unit
12 vehicle stop maintaining control unit
14 automatic stop control unit
16 notification information control unit
20 information notification unit
BPS brake sensor
BP brake pedal
PBS parking brake sensor
PKB parking brake
SPS shift position sensor
SL selector
MS master cylinder
ENG engine
EC engine controller
WS wheel cylinder

The invention claimed is:

1. An idle stop control method comprising:
in a state in which a vehicle stop maintaining control generates a braking force capable of maintaining a stop state of a vehicle, detecting, as a first detection, that a permission condition set in advance is satisfied, and a driver reduces a brake operation from a state in which the vehicle is stopped by the brake operation by the driver;
in response to the first detection, automatically stopping an engine of the vehicle;
detecting, as a second detection, that the driver changes a parking brake from a non-braking state to a braking state while the engine is automatically stopped; and
in response to the second detection, restarting the engine and notifying the driver of ignition information for indicating that a state of an ignition switch is on,
wherein
the permission condition includes a condition in which a state of a brake operation by the driver is a first brake operation state set in advance,
an operation condition to operate the vehicle stop maintaining control includes a condition in which a state of a brake operation by the driver is a second brake operation state set in advance, and
an operation amount of a brake operation by the driver included in the first brake operation state is greater than the operation amount included in the second brake operation state.

2. The idle stop control method according to claim 1, wherein the engine as automatically stopped is restarted only when a non-drive range is selected.

3. An idle stop control device comprising:
at least one processor configured to:
in a state in which a vehicle stop maintaining control generates a braking force capable of maintaining a stop state of a vehicle, automatically stop an engine of the vehicle when a permission condition set in advance is satisfied, and a driver reduces a brake operation from a state in which the vehicle is stopped by the brake operation by the driver;
detect that the driver changes a parking brake from a non-braking state to a braking state while the engine is automatically stopped; and
in response to the detection, restart the engine and notify the driver of ignition information for indicating that a state of an ignition switch is on,
wherein
the permission condition includes a condition in which a state of a brake operation by the driver is a first brake operation state set in advance,
an operation condition to operate the vehicle stop maintaining control includes a condition in which a state of a brake operation by the driver is a second brake operation state set in advance, and an operation amount of a brake operation by the driver included in the first brake operation state is greater than the operation amount included in the second brake operation state.

\* \* \* \* \*